United States Patent [19]
Yamaguchi et al.

[11] Patent Number: 4,582,889
[45] Date of Patent: Apr. 15, 1986

[54] CORROSION PREVENTIVE RESIN COMPOSITION

[75] Inventors: Kiyonaga Yamaguchi, Hiratsuka; Toshinobu Takahashi, Kiyokawamura; Shigeo Omote, Hiratsuka; Mimuo Kawaguchi, Ooisomachi, all of Japan

[73] Assignee: The Yokohama Rubber Co., Ltd., Tokyo, Japan

[21] Appl. No.: 740,010

[22] Filed: May 31, 1985

[30] Foreign Application Priority Data

Jun. 8, 1984 [JP] Japan .................. 59-116602

[51] Int. Cl.$^4$ ............................ C08G 59/28
[52] U.S. Cl. ............................ 528/59; 528/73
[58] Field of Search ................... 528/59, 73

[56] References Cited

U.S. PATENT DOCUMENTS

| 3,484,413 | 12/1969 | Kaufman | 528/59 X |
| 3,533,983 | 10/1970 | Hirosawa | 528/59 X |
| 3,636,133 | 1/1972 | Hawkins | 528/73 X |
| 3,663,652 | 5/1972 | Cannon et al. | 528/59 X |
| 3,984,376 | 10/1976 | Yokono et al. | 528/59 X |
| 4,165,247 | 8/1979 | Brew et al. | 528/73 X |
| 4,296,167 | 10/1981 | Ceintrey | 528/73 X |

Primary Examiner—Earl Nielsen
Attorney, Agent, or Firm—Bucknam and Archer

[57] ABSTRACT

There is disclosed a corrosion preventive resin composition comprising an epoxy resin and at least one curing agent therefor. The epoxy resin comprises at least 40 wt % of a specific type of urethane-modified epoxy resin which is obtained by reaction between a compound having at least one epoxy group and at least one hydroxyl group and a urethane bond-bearing compound having isocyanate end groups and obtained by reaction between a polyhydroxyl compound and a polyisocyanate compound. The curing agent for the epoxy resin is at least one member selected from the group consisting of polyamines, polyamides and polymercaptans, all of which are sparingly soluble in water.

5 Claims, No Drawings

CORROSION PREVENTIVE RESIN COMPOSITION

BACKGROUND OF THE INVENTION

1. Field of the Invention

This invention relates to the art of corrosion prevention and more particularly, to corrosion preventive resin compositions which are useful, for example, in corrosion prevention of external surfaces of reinforced concrete structures or buildings in seaside regions. The resin compositions have good adhesion, hardenability on wet surfaces, water vapor barrier properties, and flexibility.

2. Description of the Prior Art

In recent years, there have been gradually revealed damages of reinforced concrete structures or buildings (hereinafter referred to simply as RC structures or buildings) in seaside regions due to the injury from salt. Such damages include cracks, blisters, flakings, exposure of reinforcing rods, and the like. Thus, the need of taking a measure to meet the situation has now become pressing. For instance, in order to maintain and use constructed bridges over a long term without any repair works, bridges in seaside regions where environmental conditions are bad, have been constructed of cement concrete (PC structures), called "maintenance-free" concrete, since the first half of 1960. Although the PC bridges are designed to have a lifetime of 50 years, their damages have already become considerable.

The considerable injury of the PC bridges from salt has been seen in the districts from Hokkaido to the side of the Sea of Japan and of the whole islands of Okinawa in the regions of from the coastal splash zone to 200–300 m from the zone.

The reason why the RC structures are injured from salt in the coastal regions is considered as follows. At the initial stage of the hydration action in concrete, excess water is present in concrete and forms capillary interstices, from which it is released. On the contrary, after passage of several tens of hours, moisture in the air is absorbed from the capillary interstices to continue the hydration action.

Calcium hydroxide, which is a hydrate product of concrete, and free lime in cement are, of course, soluble in sea water and have a tendency of being soluble in rainwater. Accordingly, these materials are dissolved out through the capillary interstices, causing the neutralization phenomenon of concrete to occur and also the airtightness to lower.

In the splash zone where salt injury takes place, concrete structures are repeatedly dried and wetted on the surfaces thereof, so that excess water in the concrete is removed by evaporation, and water containing salt is absorbed in the concrete, thereby permitting the salt to be accumulated. This cycle is repeated with the result that an oxide film on the surface of steel rods, which are strongly alkaline (pH of about 12.5), is attacked and corrosion begins.

The corrosion reaction may depend on the degree of oxygen feed, the concentration of salt, the temperature, and the humidity. The main route of salt incorporation into concrete may be divided into two groups including one group in which salt is incorporated from concrete materials, and the other group in which after hardening, salt is incorporated into concrete from outside such as by the spray of seawater, sea breeze and the like. The first group is the case where sea sand is used. The content of salt is prescribed as particularly indicated in explanations of Road and Bridge Regulations, i.e. with reinforced concrete, the content of chlorides, calculated as NaCl, should be 0.1% or below of the weight of cement. The salt damage, which we treat here, is the latter case where salt penetrates into concrete such as by sea spray, sea breeze and the like.

When reinforcing rods have once been corroded, the volume is caused to expand to an extent of 20 times larger than an initial volume. The pressure of the expansion is as high as about 300 kg/cm$^2$, and causes the concrete to be cracked from inside, resulting in breakage of the concrete (tensile strength 50 kg/cm$^2$).

In order to prevent the damages due to the salt injury, there was proposed a method as described, for example in Japanese Laid-open Patent Application No. 57-201444. In the method, coating materials comprising synthetic resins which have a glass transition point not lower than 0° C., are applied onto the surfaces of RC structures to form a coating film on the structure surfaces. The coating film is designed to have at least certain levels of water vapor and air proofness. However, the coating material has low adherence to concrete and thus, the film tends to come off by the action of waves, flying stones. In addition, the coating material is in the form of an emulsion and does not show any curability or hardenability on wet surfaces. This is not advantageous in practical applications. Although epoxy resin coating materials have good bonding force or adherence and hardenability on wet surfaces, they are not flexible with an attendant problem that such material cannot follow cracks as will be produced in concrete by temperature change, earthquake and mechanical vibrations.

SUMMARY OF THE INVENTION

It is an object of the invention to provide corrosion preventive resin compositions which have good adhesion, curability on wet surfaces, water vapor proofness and flexibility and are thus particularly effective in preventing the salt injury of RC structures.

It is another object of the invention to provide corrosion preventive resin compositions which are useful in preventing corrosion of bridges and buildings in coastal regions.

In order to achieve the above objects, we made intensive studies and, as a result, found that a combination of an epoxy resin comprising or consisting essentially of a specific type of urethane-modified epoxy resin, and at least one specific type of polymer which is sparingly soluble in water is very effective as a corrosion preventive compositions because of the excellent properties such as adherence, bonding strength, hardenability on wet surfaces, vapor proofness, and flexibility. Preferably, a predetermined amount of a hydrophobic organic liquid material may be added to the combination.

According to the present invention, there is provided a corrosion preventive resin composition which comprises 100 parts by weight of an epoxy resin (B) containing at least 40 wt% of a urethane-modified epoxy resin (A) obtained by reacting a compound (a) having at least one epoxy group and at least one hydroxyl group with a urethane bond-bearing compound (b) having terminal isocyanate groups and obtained by reacting a polyhydroxyl compound (b$_1$) with a polyisocyanate compound (b$_2$), and from 3 to 230 parts by weight of at least one member (C) selected from the group consisting of polyamines, polyamides and polymercaptans, all of which are sparingly soluble in water. Preferably, the resin composition may further comprise from 10 to 60 parts by weight of a hydrophobic organic liquid material (D).

DETAILED DESCRIPTION OF THE INVENTION

The ingredients used in the corrosion preventive resin composition of the invention are described below.

The compounds (a) which have at least one epoxy group and at least one hydroxyl group may be any compounds which have from 1 to 3 epoxy groups and from 1 to 2 hydroxyl groups in the molecule. Examples of such compounds are glycidyl ethers of polyhydric alcohols, such as glycidol, ethylene glycol monoglycidyl ether and glycerine glycidyl ether, and commercially available epoxy resins having hydroxyl groups. These compounds (a) may be used singly or in combination.

The urethane bond-bearing compounds (b) having isocyanate end groups are prepared by reaction between polyhydroxyl compounds ($b_1$) and polyisocyanate compounds ($b_2$) by any known manner. The polyhydroxyl compounds ($b_1$) may be various polyether polyols including, for example, adducts of at least one alkylene oxide such as, for example, ethylene oxide, propylene oxide, butylene oxide or tetrahydrofuran, to a compound having two or more active hydrogen atoms. The compounds having two or more active hydrogen atoms include various polyhydric alcohols, amines, alkanolamines and polyhydric phenols. The polyhydric alcohols are, for example, ethylene glycol, propylene glycol, butanediol, diethylene glycol, glycerine, hexanetriol and trimethylolpropane. The amines include ethylenediamine and hexamethylenediamine. The alkanolamines include ethanolamine and propanolamine. The polyhydric phenols include resorcin and bisphenol A.

The polyisocyanate compounds ($b_2$) are compounds which have two or more isocyanate groups in one molecule thereof. Various polyisocyanate compounds, which are used in preparing ordinary polyurethane resins, are usable in the practice of the invention and include, for example, tolylene diisocyanate, diphenylmethane diisocyanate, triphenylmethane triisocyanate and hydrogenated products thereof, hexamethylene diisocyanate, isophorone diisocyanate, and the like.

The urethane bond-bearing compound (b) having isocyanate end groups is reacted with the compound (a) having at least one epoxy group and at least one hydroxyl group in a usual manner, thereby obtaining urethane-modified epoxy resins (A). The epoxy resins (A) are exemplified by urethane-modified epoxy resins (A)-1 through (A)-6 in Table 2 indicated later.

The urethane-modified epoxy resin (A) should be used in an amount not less than 40 wt% of the epoxy resin (B) in the resin composition of this invention. In addition, the epoxy resin (B) may consist entirely of the urethane-modified epoxy resin (A), or may be a combination of the urethane epoxy resin (A) and general-purpose epoxy resins. The general-purpose epoxy resins used in the practice of the invention may be those having at least two epoxy groups in the molecule and they include bisphenol-type epoxy resins, hydrogenation products thereof and aliphatic epoxy resins. Once again, the urethane-modified epoxy resins (A) should be contained in amounts not less than 40 wt% of the epoxy resin (B). If the content of the urethane-modified epoxy resin (A) is less than 40 wt%, satisfactory flexibility is not obtained in the resulting final product.

The corrosion preventive resin composition of the invention is obtained by incorporating the epoxy resin (B) with a certain amount of at least one polymer (C) selected from the group consisting of polyamines, polyamides and polymercaptans which are all sparingly soluble in water. The at least one polymer (C) is used in an amount of from 3 to 230 parts by weight per 100 parts by weight of the epoxy resin (B). Amounts less than 3 parts by weight are unfavorable because of the unsatisfactory curability. On the other hand, amounts larger than 230 parts by weight are also unfavorable because the curing agents remain unreacted. In either case, the cohesive force of the corrosion preventive composition itself becomes lower, so that the bonding force and water vapor proofness also lower.

The sparingly soluble polyamines, polyamides and polymercaptans used in the present invention are hardeners for epoxy resin which are sparingly soluble in water and are replaceable with water molecules. Such hardeners include, for example, aromatic amines, polyalkylene-polyamines, amide polyamines, heterocyclic diamines, amine adducts, polyamide resins, polymercaptans, and the like. These hardeners may be used singly or in combination. Specific examples include: aromatic amines such as m-phenylenediamine, 4,4'-methylenedianiline, and the like; polyalkylene-polyamines such as dibutylaminopropylamine, bis(hexamethylene)triamine, and the like; amide polyamines such as amide polyamine obtained from tall oil and triethylenetetramine, amide polyamine obtained from ricinoleic acid and triethylenetetramine, and the like; heterocyclic diamines such as 3,9-bis(3-aminopropyl)-2,4,8,10-tetroxaspiro[5,5]-undecane; amine adducts such as epoxy resin-amine adduct obtained from neopentyl glycol, glycidyl ether and m-xylylenediamine, cyanoethylated polyamine obtained from acrylonitrile and diethylenetriamine, ketimine obtained from acetone and diethylenetriamine, and the like; polyamides such as polyamide obtained from linolein dimer and ethylenediamine, polyamide obtained from linoleic acid dimer and diethylenetriamine, and the like; and polymercaptans such as the reaction product of a polysulfide such as HS-($C_2H_4$-O-$CH_2$-O-$C_2H_4$-S-S)$_n$-$C_2H_4$-O-$CH_2$-O-$C_2H_4$-SH, bisphenol A glycidyl ether, and 1,3-dimercapto-2-propanol, the reaction product of succinic acid and bis(2-mercaptoethylene)sulfide, and trimercaptomethyltrioxane.

In the practice of the invention, ordinary hardeners for room temperature hardening and hardening promoters may be used along with the sparingly soluble hardener (C). Examples of the ordinary hardeners for room temperature hardening are aliphatic polyamines such as triethylenetetramine, dimethylaminopropylamine, and the like. Examples of the hardening promoters include tertiary amines such as dimethylaminoethanol, 1,8-diaza-bicyclo-(5,4,0)undecene-7-tris(dimethylaminomethyl)phenol, and the like, salts of amines and acids such as tri-2-ethylhexylate of tris(dimethylaminomethyl)-phenol, phenols such as resorcin, bisphenol A, and the like, acids such as oxalic acid, 2-ethylhexylic acid, salicylic acid, and the like, alcohols such as methanol, ethanol, cyclohexyl alcohol, and the like, and triphenylphosphate.

The corrosion preventive resin composition may further comprise a hydrophobic organic liquid material (D) in order to further improve corrosion preventive performance. The amount of the liquid material (D) is generally in the range of from 10 to 60 parts by weight per 100 parts by weight of the epoxy resin (B). Amounts less than 10 parts by weight are not favorable since the significant effect of the hydrophobic material does not appear, whereas when the amounts exceed 60 parts by weight, the strength of the resulting final product lowers to an unfavorable extent in practical applications.

The hydrophobic organic liquid materials (D) useful in the practice of the invention are, for example, naphthene hydrocarbons, coal tar, asphalt, petroleum aromatic polymerized oils, cumarone-indene resin, petrolactam, xylene resin, paraffin hydrocarbons, liquid chloroprene rubber, liquid nitrile-butadiene rubber, and the like. These materials (D) may be used singly or in combination.

The corrosion preventive composition of the invention may be mixed with aggregates and/or reinforcing materials in suitable amounts, if necessary. The aggregates may be talc, mica, acid clay, diatom earth, kaolin, quartz, iron powder, fly ash, titanium oxide, ferrite, zirconia, carbon black, silica, various Portland cements, blast-furnace cement, alumina cement, or mixtures thereof. The reinforcing materials may be glass fibers, asbestos fibers, carbon fibers, or mixtures thereof.

In order to improve adhesion and bonding properties, silane couplers may be added to the corrosion preventive resin composition of the invention. For this purpose, there are used vinyl triethoxysilane, gamma-methacryloxypropyltrimethoxysilane, gamma-aminopropyltrimethoxysilane, N-beta-(aminoethyl)-gamma-aminopropyltrimethoxysilane, gamma-glycidoxypropyltrimethoxysilane, gamma-mercaptopropyltrimethoxysilane, and the like.

In order to apply the corrosion preventive resin composition of the invention for prevention of salt injury, largely spaced portions such as joints and gaps of RC structures, which are to be prevented from the salt injury, may be first filled with epoxy fillers or cement pastes. Then, the composition of the invention is preferably applied to the RC structures. If RC structures deteriorate on the surfaces thereof and become fragile, it is possible to apply the composition of the invention after reinforcement of the structures by application of a primer coating such as, for example, a penetrable epoxy primer. Needless to say, the corrosion preventive film obtained from the composition of the invention may be further coated with ordinary paints in order to protect the film surface.

The present invention is more particularly described by way of examples and comparative examples, in which parts are by weight.

EXAMPLES 1-10 AND COMPARATIVE EXAMPLES 1-2

Principal ingredients of the formulations indicated in column "Principal Ingredient (I)" in Table 1 were each prepared by mixing on a paint mill. Likewise, hardeners of the formulations indicated in column "Curing agent (II)" in Table 1 were each prepared by mixing on a paint mill. The principal ingredients and the hardeners were, respectively, mixed to obtain corrosion preventive resin compositions.

In Table 2, there are shown general formulas of urethane-modified epoxy resins (A) which are obtained by reaction between compounds (a) having epoxy group and hydroxyl groups and urethane bond-bearing compounds (b) which have isocyanate end groups and are obtained by reaction between polyhydroxyl compounds ($b_1$) and polyisocyanate compounds ($b_2$), and also constituents of urethane-modified epoxy resins (A)-1 through 6 used in examples and indicated in Table 1.

The characteristic properties of the thus obtained corrosion preventive resin compositions, i.e. vertical tensile bond strength, hardenability on wet surface, coefficient of water vapor permeation, crack follow-up test, and salt spray test, are shown in Table 1. These properties were measured according to the following procedures.

(1) Vertical tensile bond test: a corrosion preventive resin composition was applied, in a thickness of 1 mm, on the surface of a 40 mm×40 mm×160 mm concrete piece for PC pipe and hardened at 20° C. for 1 week, followed by measuring the bonding strength at 20° C. according to the method prescribed in JIS A 6909 (Synthetic Resin Emulsion Sand Wall-Spraying Material) using an adhesion tester (by Elkometer Instruments Co., Ltd.).

(2) Curability on wet surfaces: a 40 mm×40 mm×160 mm concrete piece for PC pipe was immersed in water to half of the thickness (20 mm). One day after the immersion, the concrete piece was confirmed to be wetted sufficiently, after which a corrosion preventive composition was applied in a thickness of 1 mm and hardened at 20° C. for 1 week under wetting conditions. The hardened composition was subjected to the JIS hardness tester. The hardness was taken as "o" when the hardness value was over 30, inclusive, and as "x" when the value was below 30.

(3) Coefficient of water vapor permeation: a 0.1 mm sheet of a corrosion preventive composition or material was made and hardened at 20° C. for 1 week, followed by measuring the coefficient of water vapor permeation according to the St-REGIS method. For the measurement, there was used a Lyssy full-automatic water vapor permeability measuring apparatus (L80-3001B).

(4) Crack follow-up test: a corrosion preventive composition was applied, in a thickness of 1 mm, on the surface of a 40 mm×40 mm×160 mm concrete piece for PC pipe and hardened at 20° C. for 1 week, followed by subjecting to the three-point bending test according to the method prescribed in JIS K 7203-1982 (Hard Plastic Bending Test). The autograph used a IS-5000, made by Shimadzu Mfg. Co., Ltd., and the distance between supports was 100 mm. The bending speed was 10 mm/minute. At the time when cracks were produced in the concrete, the bending was immediately stopped. A corrosion preventive sheet was evaluated as "o" when no cracks were produced, and as "x" when cracks were produced.

(5) Salt spray test: a 300×300×100 mm block was used as an RC test piece, in which five polished round steels having a diameter of 13 mm were inserted into each of the upper and lower surfaces so that the covered thicknesses were, respectively, 20 mm and 30 mm.

The concrete used had a composition of cement/river sand/river gravel=1/2.6/3.1 (ratio by volume). The water-to-cement ratio was 55% and a slump value was 18 cm.

The concrete was aged at room temperature for 4 weeks, after which a corrosion preventive composition was applied to the whole outer surfaces of the concrete in a thickness of 1 mm, followed by aging at 20° C. for 2 weeks and subjecting to the salt spray test. The tester used was of Model ST-J, made by Toyo Rika Ind. Co., Ltd., using a saline solution with a concentration of 3%.

The saline solution was continuously sprayed at an internal temperature of 35°±2° C. The salt spray time was determined before an abnormal appearance was shown and the round steels were corroded.

TABLE 1

|  | Example/Com. Ex. No. | | | | | | | |
|---|---|---|---|---|---|---|---|---|
|  | Example 1 | Example 2 | Example 3 | Example 4 | Example 5 | Example 6 | Example 7 | Example 8 |
| Formulation | | | | | | | | |
| (I) Primary Ingredient: | | | | | | | | |
| urethane-modified epoxy resin (A)-1 | 100 | | | | | | | |
| urethane-modified epoxy resin (A)-2 | | 50 | | | 50 | | 40 | 50 |
| urethane-modified epoxy resin (A)-3 | | | 40 | | | | | |
| urethane-modified epoxy resin (A)-4 | | | | 100 | | | | |
| urethane-modified epoxy resin (A)-5 | | 50 | | | 50 | | | 50 |
| urethane-modified epoxy resin (A)-6 | | | | | | 60 | | |
| epoxy resin *1 | | | 60 | | | 40 | 60 | |
| epoxy reson *2 | | | | | | | | |
| silane coupler *3 | 2 | 2 | 2 | 2 | 2 | 2 | 2 | |
| silica | | 48 | 48 | 48 | 48 | 48 | 48 | 50 |
| total | 102 | 150 | 150 | 150 | 150 | 150 | 150 | 150 |
| (II) Curing agent: | | | | | | | | |
| sparingly soluble polyamine (C)-1 *4 | | 3 | | | 3 | 14 | | 3 |
| sparingly soluble polyamine (C)-2 *5 | | | | | | | 40 | |
| sparingly soluble polyamide (C)-3 *6 | 9 | | | | | | | |
| sparingly soluble polymercaptan (C)-4 *7 | | | | 9 | | | | |
| sparingly soluble polyamine (C)-5 *8 | | | 230 | 1 | | | | |
| tertiary amine | | | 2 | | | | | |
| hydrophobic organic liquid material (D)-1 *9 | 20 | 20 | 20 | 20 | 10 | 20 | 60 | 20 |
| hydrophobic organic liquid material (D)-2 *10 | | | | | | | | |
| silica | | 7 | 123 | 15 | 7 | 16 | 50 | 27 |
| total | 29 | 30 | 375 | 45 | 20 | 50 | 150 | 50 |
| (I)/(II) ratio | 78/22 | 83/17 | 29/71 | 77/23 | 88/12 | 75/25 | 50/50 | 75/25 |
| Characteristics: | | | | | | | | |
| vertical tensile bonding test (kg/cm$^2$) | 22A | 18A | 15A | 20A | 20A | 35A | 30A | 15B |
| hardenability on wet surface | o | o | o | o | o | o | o | o |
| coefficient of water vapor permeation (g · cm/cm$^2$ · second · cmHg) *11 | 3.0 × 10$^{-11}$ | 4.5 × 10$^{-11}$ | 9.5 × 10$^{-11}$ | 2.5 × 10$^{-11}$ | 6.0 × 10$^{-11}$ | 7.5 × 10$^{-11}$ | 5.0 × 10$^{-11}$ | 4.5 × 10$^{-11}$ |
| crack follow-up test | o | o | o | o | o | o | o | o |
| salt spray test (hrs.) | >5000 | >5000 | >5000 | >5000 | >5000 | >5000 | >5000 | >4000 |

| Formulation | Example 9 | Example 10 | Comp. Example 1 | Comp. Example 2 |
|---|---|---|---|---|
| (I) Primary Ingredient: | | | | |
| urethane-modified epoxy resin (A)-1 | | | | acrylic emulsion corrosion preventive material |
| urethane-modified epoxy resin (A)-2 | 50 | 50 | | |
| urethane-modified epoxy resin (A)-3 | | | | |
| urethane-modified epoxy resin (A)-4 | | | | |
| urethane-modified epoxy resin (A)-5 | 50 | 50 | | |
| urethane-modified epoxy resin (A)-6 | | | | |
| epoxy resin *1 | | | | |
| epoxy resin *2 | | | 100 | |
| silane coupler *3 | 2 | 2 | 2 | |
| silica | 48 | 48 | 48 | |
| total | 150 | 150 | 150 | |
| (II) Curing agent: | | | | |
| sparingly soluble polyamine (C)-1 *4 | 3 | 3 | 15 | |
| sparingly soluble polyamine (C)-2 *5 | | | | |
| sparingly soluble polyamine (C)-3 *6 | | | | |
| sparingly soluble polymercaptan (C)-4 *7 | | | | |
| sparingly soluble polyamine (C)-5 *8 | | | | |
| tertiary amine | | | | |
| hydrophobic organic liquid material (D)-1 *9 | | | | |
| hydrophobic organic liquid material (D)-2 *10 | | 10 | 10 | |
| silica | 7 | 7 | 7 | |
| total | 10 | 20 | 32 | |
| (I)/(II) ratio | 94/6 | 88/12 | 82/18 | |
| Characteristics: | | | | |
| vertical tensile bonding test (kg/cm$^2$) | 22A | 20A | 40C | 7B |
| hardenability on wet surface | o | o | o | x |

TABLE 1-continued

|  | | | | |
|---|---|---|---|---|
| coefficient of water vapor permeation (g · cm/cm$^2$ · second · cmHg) *11 | 2.0 × 10$^{-10}$ | 6.0 × 10$^{-11}$ | 2.0 × 10$^{-11}$ | 6.0 × 10$^{-10}$ |
| crack follow-up test | o | o | x | o |
| salt spray test (hrs.) | >4000 | >5000 | >5000 | >3000 |

*1 Neopentyl glycol diglycidyl ether available under the commercial name of Epolite 1500NP from Kyoei Oils and Fats Co., Ltd., with an epoxy equivalent of about 150.
*2 Bisphenol A epoxy resin having an epoxy equivalent of about 250 and available under the commercial name of Epikote 834 from Shell Chem. Co., Ltd.
*3 Gamma-glycidoxypropyltrimethoxysilane available under the commercial name of A187 from Nippon Unikar Co., Ltd.
*4 m-Xylylenediamine having an amine equivalent of about 38 and available under the commercial name of MXDA from Mitsubishi Gas Chem. Co., Ltd.
*5 3,9-Bis(3-aminopropyl)-2,4,8,10-tetroxaspiro[5,5]-undecane having an amine equivalent of about 90 and available under the commercial name of Epomate B002 from Ajinomoto Co., Ltd.
*6 Polyamide having an amine equivalent of about 110 and available under the commercial name of Sanmide #310 from Sanwa Chem. Co., Ltd.
*7 Polymercaptan having a mercapto equivalent of about 114 and available under the commercial name of EHX-317 from Asahi Denka Ind. Co., Ltd.
*8 Polyoxypropyleneamine having an amine equivalent of about 52 and available under the commercial name of Jefamine D-2000 from Nishiki Shoji Co., Ltd.
*9 Xylene resin available under the commercial name of Nikanol LLL-A from Mitsubishi Gas Chem. Co., Ltd.
*10 Coal tar available under the commercial name of Bituresin UPX-100 from Usagida Chem. Co., Ltd.
*11 A indicates cohesive failure of a corrosion preventive material, B indicates interfacial breakage between concrete and corrosion preventive material, and C indicates breakage of concrete.
*12 Acrylic emulsion corrosion preventive material (butylacrylate/butyl methacrylate = 90/10)/water/surface active agent/kaolin/calcium carbonate = 100/100/1/30/10.

TABLE 2

| urethane-modified epoxy resin | general formula (a) — (b$_2$) — (b$_1$) — (b$_2$) — (a) | | | epoxy equivalent |
|---|---|---|---|---|
| | (a) | (b$_1$) | (b$_2$) | |
| (A)-1 | glycidol | polytetramethylene glycol (M.W. 2000) | tolylene-diisocyanate | 1250 |
| (A)-2 | glycidol | polytetramethylene glycol (M.W. 2000) | diphenyl-methane diisocyanate | 1325 |
| (A)-3 | glycidol | polytetramethylene glycol (M.W. 2000) | hydrogenated diphenyl-methane diisocyanate | 1335 |
| (A)-4 | glycidol | polytetramethylene glycol (M.W. 2000) | hexamethylene diisocyanate | 1245 |
| (A)-5 | glycidol | polypropylene glycol (M.W. 2000) | diphenyl methane diisocyanate | 1325 |
| (A)-6 | glycidol | polytetramethylene glycol (M.W. 850) | hexamethylene diisocyanate | 670 |

As will be clear from the results of Table 1, the corrosion preventive compositions of Examples 1 through 10 according to the invention are higher than the materials of Comparative Examples 1 and 2 with respect to the bonding force, curability on wet surfaces, water vapor shielding property and the like.

The corrosion preventive resin compositions of the invention are effective in preventing salt injury of bridges and buildings installed around coastal areas, and may also be applied in various fields of ordinary engineering and construction works as corrosion preventive materials, sealing materials and adhesives.

What is claimed is:

1. A corrosion preventive resin composition which comprises 100 parts by weight of an epoxy resin (B) containing at least 40 wt% of a urethane-modified epoxy resin (A) obtained by reacting a compound (a) having at least one epoxy group and at least one hydroxyl group with a urethane bond-bearing compound (b) having isocyanate end groups and obtained by reacting a polyhydroxyl compound (b$_1$) with a polyisocyanate compound (b$_2$), and from 3 to 230 parts by weight of at least one member (C) selected from the group consisting of polyamines, polyamides and polymercaptans, all of which are sparingly soluble in water.

2. A corrosion preventive resin composition according to claim 1, wherein said epoxy resin (B) consists essentially of said urethane-modified epoxy resin (A).

3. A corrosion preventive resin composition according to claim 1, wherein said compound (a) is a glycidyl ether of a polyhydric alcohol having from 1 to 3 epoxy groups and from 1 to 2 hydroxyl groups.

4. A corrosion preventive resin composition according to claim 1, further comprising from 10 to 60 parts by weight of a hydrophobic organic liquid material per 100 parts by weight of said epoxy resin (B).

5. A corrosion preventive resin composition according to claim 1, further comprising aggregates and/or reinforcing materials.

* * * * *